Aug. 18, 1953  W. BLUE  2,649,038
RANGE FINDER ADAPTER FOR CAMERAS
Filed Aug. 14, 1950  2 Sheets-Sheet 1

Inventor
Wayne Blue
By Clarence A. O'Brien
and Harvey B. Jacobson
Attorneys

Aug. 18, 1953 W. BLUE 2,649,038
RANGE FINDER ADAPTER FOR CAMERAS
Filed Aug. 14, 1950 2 Sheets-Sheet 2

Inventor
Wayne Blue

By *Clarence A. O'Brien and Harvey B. Jacobson*
Attorneys

Patented Aug. 18, 1953

2,649,038

UNITED STATES PATENT OFFICE 2,649,038

RANGE FINDER ADAPTER FOR CAMERAS

Wayne Blue, Long Beach, Calif.

Application August 14, 1950, Serial No. 179,293

2 Claims. (Cl. 95—44)

This invention comprises novel and useful improvements in camera attachments, and more particularly pertains to a range finder adapter for use with a conventional camera having a focusing lens which is movable toward and away from the camera casing.

An important object of this invention is to provide a combination range finder and view finder adapter for cameras, in which a conventional camera having focusing lens which is movable toward and away from the camera casing may be detachably mounted without altering the construction of the camera, whereby the determination of whether the camera lens is focused on an object may be made with facility.

Another important object of this invention is to provide a range finder adapter, in accordance with the foregoing object, which adapter is of simple construction and in which adapter the camera may be readily and accurately adjusted relative to the adapter to insure proper correlation between the camera and the adapter.

An important feature of this invention resides in the provision of an adapter base, a pair of standards on the base, a range finder adapter mounted on the standards to overlie the camera interposed between the range finder and the base.

Another important feature of this invention resides in the provision of the range finder adapter, in accordance with the foregoing feature, which has a rear transparent pane which is adapted to be disposed coplanar with the film in the camera casing, and which has a lens of the same focal length as the focusing lens of the camera, with means for coupling the adapter lens to the camera lens for movement therewith.

Yet another feature of this invention resides in the provision of a range finder adapter in accordance with the foregoing features, in which the base is vertically pivotally mounted to permit the camera and the range finder adapter to be swung, as a unit, to a horizontal position.

These, together with various ancillary objects and features are attained by this device, a preferred embodiment of which has been illustrated, by way of example only, in the accompanying drawings, wherein.

Figures 1, 3:
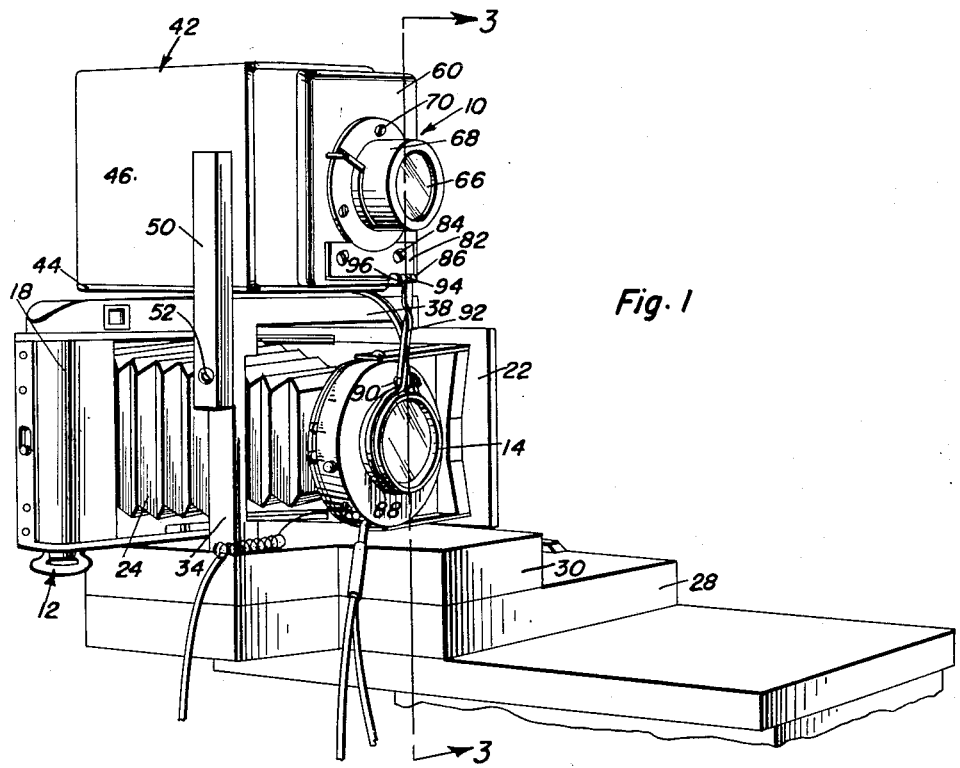
Figure 1 is a perspective elevational view of the adapter unit with the camera shown mounted thereon.
Figure 3 is a longitudinal sectional view of the adapter, with the camera mounted thereon.
Figure 2:
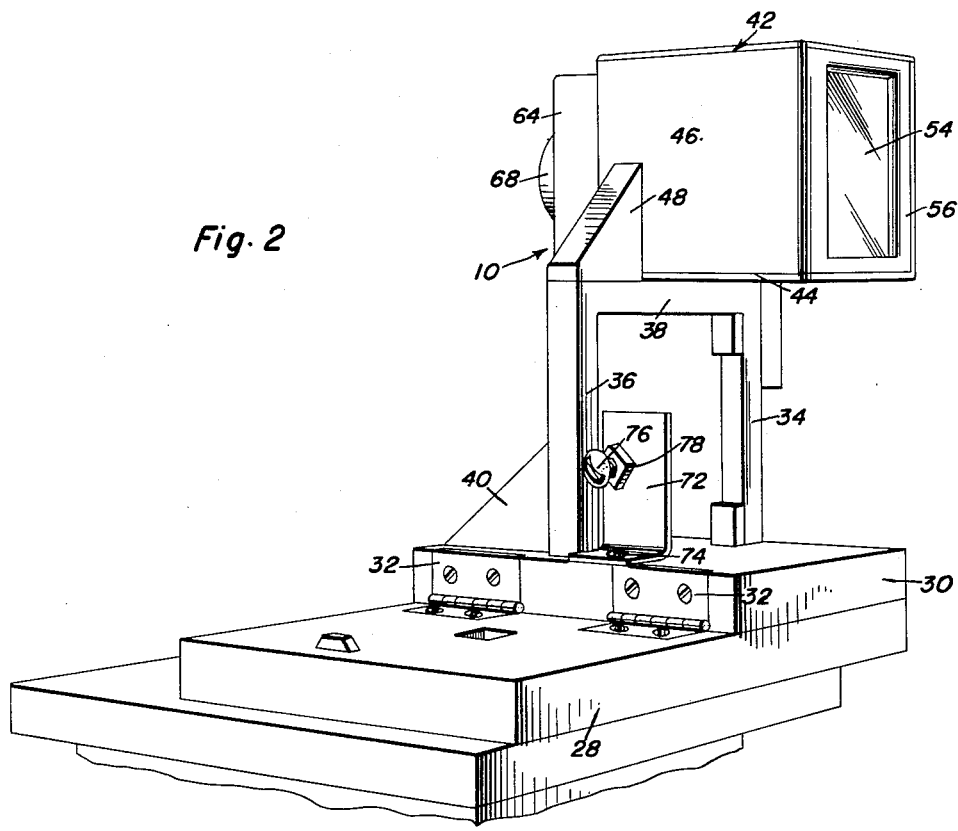
Figure 2 is a perspective elevational view of the adapter unit with the camera removed.
Figure 4:
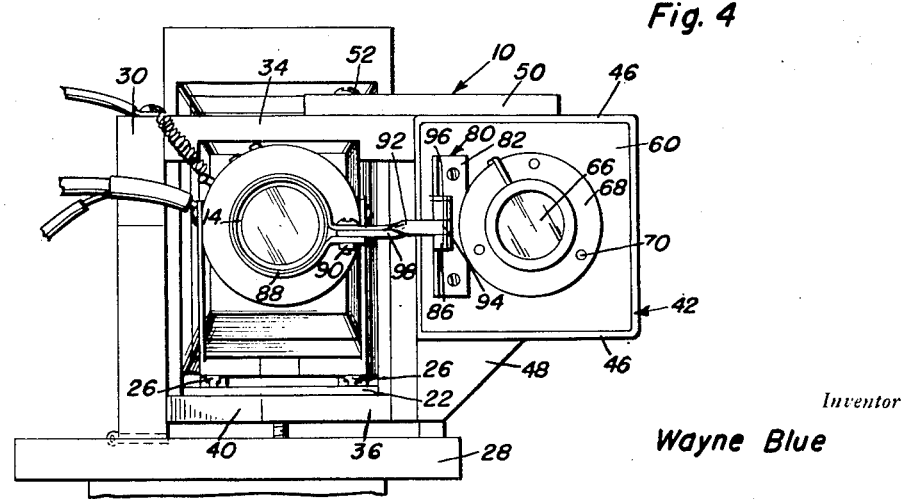
Figure 4 is a front elevational view of the adapter unit with the camera mounted thereon, both of which are pivoted as a unit into a horizontal position.

Reference is now made more specifically to the accompanying drawings, wherein like numerals designate similar parts throughout the various views. The range finder adapter, indicated generally by the numeral 10, is adapted to be used with a conventional camera, indicated generally by the numeral 12, and which camera is preferably of the type in which the focusing lens 14 is movable toward and away from the rear wall 16 of the camera casing 18. As is conventional, a suitable strip of light sensitive film 20 is disposed in the casing 18, parallel to the rear wall 16 thereof.

It is preferred that the cameras which are utilized in the adapter 10 be provided with a suitable plate member 22, which may provide the closure member for the casing when the lens 14 and bellows 24 are collapsed into the casing 18, and which plate member has provided thereon suitable guideways 26 by means of which the lens 14 is guidably and slidably mounted upon the plate member 22 for movement longitudinally thereof. The above structure, which is conventional, of itself forms no part of this invention, and has only been described in order that the operation of the adapter unit may be more readily appreciated.

The adapter 10 includes a platform 28 and a base member 30, which base member is vertically pivotally attached to the platform by means of hinges 32, or the like.

A pair of standards 34 and 36 are attached to the base member 30, and extend perpendicularly thereof, and a connecting bar 38 is terminally attached to the upper ends of the standards. An adapter housing 42 having a bottom wall 44 and side walls 46 is supported by the connecting bar 38 in spaced relation to the base member 30, a suitable reinforcing rib 48 being secured to the sides 46 of the housing 42, and to the connector bar 38, to retain the adapter housing on the connector bar 38.

A brace arm 50 is secured to the side of the housing 42, remote from the rib 48, and which arm is preferably attached to the standard 34 by means of a screw or bolt 52. In certain circumstances, it will be found advantageous to permit angular adjustment of the housing 42 relative to the standards 36 and 34, and for this reason it is preferred that the rib 48 be secured to the connecting bar 38, but that the housing be slidably disposed adjacent the rib. In this manner, it will be appreciated that the screw 52 may be loosened to permit the housing 42 to be angularly adjusted relative to the standards.

A transparent view plate 54 is disposed in the rear portion of the housing 42 between the spaced flanges 56 and 58 which are secured to the inner periphery of the housing. A movable wall 60 having an aperture 62 therein, and a rearwardly extending perimetric wall 64, which constitutes a bellows, is slidably disposed within the housing 42 so as to be movable longitudinally thereof. A lens 66 mounted in a suitable housing 68 is attached to the front wall 60, by means of fasteners 70. It is intended that the lens 66 be of the same focal length as the lens 14 of the camera 12.

An L-shaped arm 72 has one leg thereof attached to the base 30 by means of a fastener 74, the other leg of the arm being disposed coplanar with the inside of the standard 36, a bolt 76 being threadedly received in the upwardly extending leg of the arm 72, which bolt is adapted to be received in an internally threaded aperture customarily provided in the plate member 22. A locking nut 78 is carried by the bolt 76, whereby the camera may be locked in its adjusted position relative to the adapter unit 10.

The movable wall 60, and the lens 66 carried thereby, is operatively attached to the camera lens 14, for movement therewith by means of an L-shaped bracket 80 having one leg 82 thereof secured to the movable wall by means of fasteners 84, the other leg of which bracket has a pair of hinge pin receiving knuckles 86 formed integrally therewith. An annular clamping ring 88, having a fastener 90 adjustably securing the ends thereof together, is provided with a radially extending finger 92 having a knuckle 94 formed integrally therewith. A hinge pin 96 is disposed through the knuckles 86 and 94, whereby the clamping ring is hingedly connected to the bracket 82. An adjusting arm 98 having one end thereof secured to the fastener 90 is provided in order to selectively lock the movable wall to the camera lens 14, when the lens 14 of the camera and the lens 66 of the adapter are adjusted so as to be coplanar with each other. For this purpose, the other end of the arm 98 is provided with a slot 100 through which extends the fastener 102, which longitudinally adjustably secures the arm 98 to the perimetric wall 64 carried by the movable wall 60.

As will be apparent from a consideration of the accompanying drawings, the adapter 10 and the camera 12 may be swung as a unit to a horizontal position without altering the manner in which the adapter functions relative to the camera.

In operation, the camera 12 is positioned between the base 30 and the housing 42 and secured in position by means of the bolt 76 which is received in a threaded aperture in the mounting plate 22. Since it is apparent that cameras having focusing lenses 14 which are disposed at various distances away from the mounting plate 22 may be utilized, it is intended that the position of the camera be adjusted so that the lens of the camera and that of the adapter be in substantial vertical alignment, by means of the bolt 76 and nut 78.

The clamp ring 88 is then attached to the camera lens mounting sleeve, and locked thereto by means of the fastener 90. The adapter lens 66 and the camera lens 14 are then shifted into a position so as to lie coplanar with each other and the adjustment arm 98 then locked to the perimetric wall 64 of the movable wall 60. Since, as previously stated, the transparent view plate 54 is disposed coplanar with the film 20 in the camera casing, it will be appreciated that when the objective is focused relative to the view pane 54 by the lens 66 that it will also be focused on the film 20 by the lens 14.

Since it is intended that the adapter may also be utilized as a view finder, it is intended that the size of the view pane 54 be substantially equal to that of the exposed area of the film 20.

Since the lens of the adapter 10 and the lens of the camera 12 are laterally spaced from each other, it is intended that the housing 42 be angularly adjusted relative to the standards 34 and 36 in order that the adapter and the camera may be focused on the same objective. As will be appreciated, compensation for the spacing between the lenses 14 and 66 will not be necessary when the adapter is merely utilized as a range finder, such correction only being necessary when the latter is utilized as a view finder.

From the foregoing, it is felt that the operation and construction of the device will be readily understood and further discussion is therefore believed to be unnecessary. However, since numerous modifications will readily occur to those skilled in the art after a consideration of the foregoing specification and accompanying drawings, it is not intended to limit the invention to that shown and described, but all suitable modifications may be resorted to, falling within the scope of the appended claims.

Having described the invention, what is claimed as new is:

1. A range finder and direct viewer adapter for a camera having a casing and a focusing lens movable relative to said casing, said adapter including a base, a frame carried by said base for receiving a camera, means for removably securing said camera to said frame, a pair of spaced standards carried by said frame, an adapter housing disposed between said standards, one of said standards being adjustably secured to said frame for clampingly engaging said adapter housing, said adapter housing having an apertured movable wall, a lens carried by said movable wall and overlying said aperture therein, means for connecting said lens to a focusing lens of said camera for movement therewith, said camera securing means including a fastener carried by said base engaged in a threaded fitting carried by the camera casing.

2. A range finder and direct viewer adapter for a camera having a casing and focusing lens movable relative to said casing, said adapter including a base, a frame carried by said base for receiving a camera, means for removably securing said camera to said frame, a pair of spaced standards carried by said frame, an adapter housing disposed between said standards, one of said standards being adjustably secured to said frame for clampingly engaging said adapter housing, said adapter housing having an apertured movable wall, a lens carried by said movable wall and overlying said aperture therein, means for connecting said lens to a focusing lens of said camera for movement therewith, said camera securing means including a fastener carried by said base engaged in a threaded fitting carried by the camera casing, said fastener being adjustable relative to said base for aligning said camera relative to said base and said adapter housing.

WAYNE BLUE.

References Cited in the file of this patent

UNITED STATES PATENTS

| Number | Name | Date |
|---|---|---|
| 657,569 | Schaub | Sept. 11, 1900 |
| 1,707,625 | Crockett | Apr. 2, 1929 |
| 1,968,476 | Burns | July 31, 1934 |
| 2,124,468 | Parlini | July 19, 1938 |
| 2,528,085 | Sanford | Oct. 31, 1950 |
| 2,570,888 | Urie | Oct. 9, 1951 |

FOREIGN PATENTS

| Number | Country | Date |
|---|---|---|
| 25,515 | Great Britain | of 1905 |
| 603,157 | France | Jan. 6, 1926 |